No. 788,342. PATENTED APR. 25, 1905.
F. L. WILLIAMS & J. J. DUCHESNE.
POWER MECHANISM.
APPLICATION FILED FEB. 24, 1904.
2 SHEETS—SHEET 1.
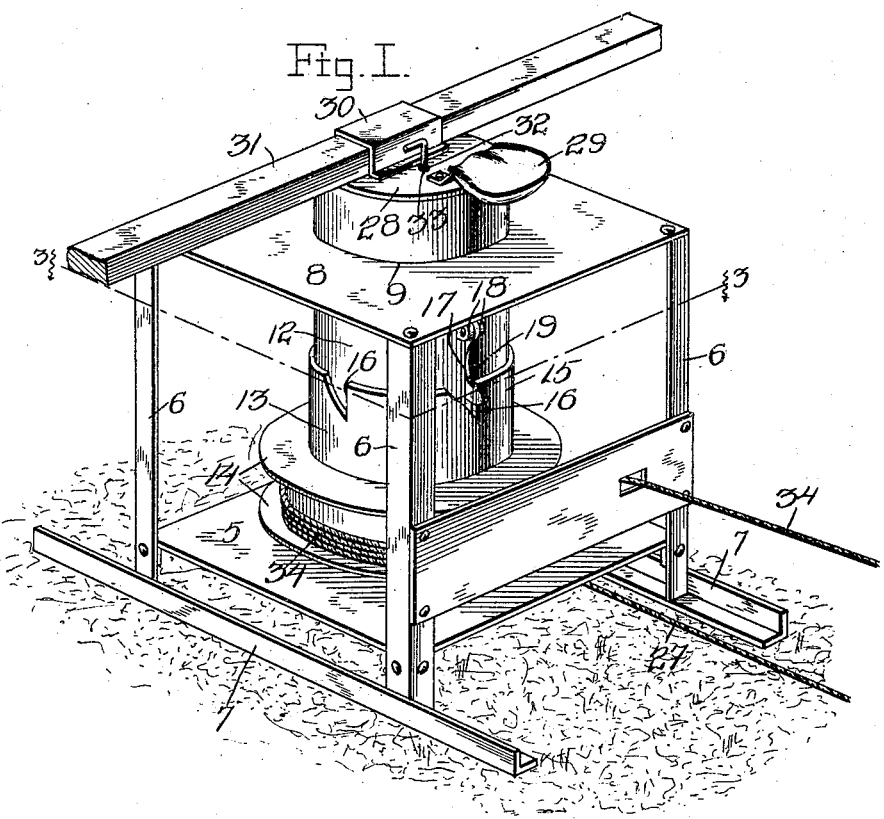
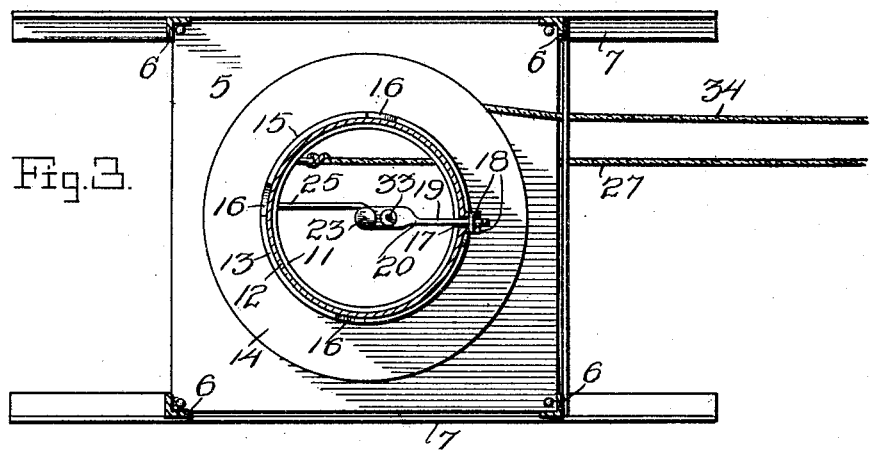
Witnesses
E. K. Reichenbach.
F. C. Jones
Inventors
F. L. Williams
and J. J. Duchesne.
by Chandler & Chandler, Attorneys

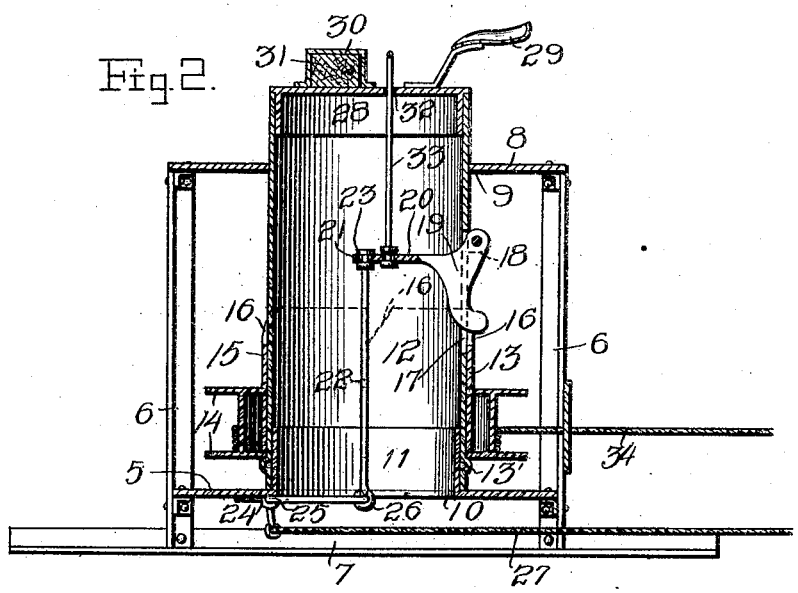
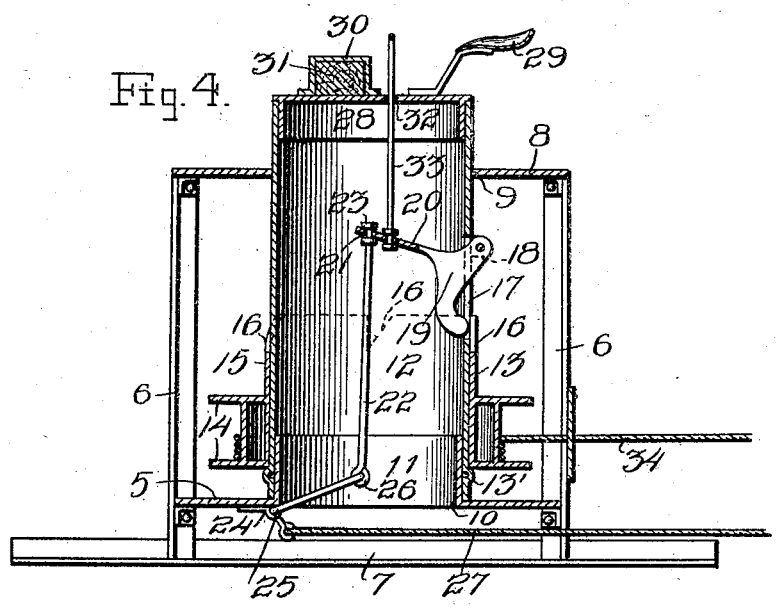

No. 788,342.

Patented April 25, 1905.

UNITED STATES PATENT OFFICE.

FRANK L. WILLIAMS AND JOSEPH J. DUCHESNE, OF PORTAGE, WISCONSIN.

POWER MECHANISM.

SPECIFICATION forming part of Letters Patent No. 788,342, dated April 25, 1905.

Application filed February 24, 1904. Serial No. 194,998.

*To all whom it may concern:*

Be it known that we, FRANK L. WILLIAMS and JOSEPH J. DUCHESNE, citizens of the United States, residing at Portage, in the county of Columbia, State of Wisconsin, have invented certain new and useful Improvements in Power Mechanisms; and we do hereby declare the following to be a full, clear, and exact description of the invention, such as will enable others skilled in the art to which it appertains to make and use the same.

This invention relates to power mechanisms, and more particularly to those operated by horses, and has for its object to provide a machine of this nature for use in connection with hay-forks or similar instruments in which it is desired to allow the cable to become slack at times and which will be so constructed that the slackening of the cable may be accomplished without stopping the horses.

In the drawings forming a portion of this specification, and in which like numerals of reference indicate similar parts in the several views, Figure 1 is a perspective view of the complete power mechanism. Fig. 2 is a longitudinal section of Fig. 1. Fig. 3 is a transverse section of Fig. 1 on line 3 3. Fig. 4 is a view similar to Fig. 2, showing the clutch mechanism disengaged.

Referring now to the drawings, there is shown a platform 5, having uprights 6 at its corners, to the lower ends of which are secured runners 7, upon which the power mechanism may be moved from place to place. To the upper ends of the uprights 6 is secured a platform 8, which has a circular opening 9 therein disposed above and alining with an opening 10 in the platform 5. An upwardly-extending flange 11 surrounds the opening 10, and with this flange is engaged a hollow cylindrical drum 12, which passes upward through the opening 9 and which has a collar 13' secured to its outer face adjacent to its lower end.

Engaged with and loosely disposed upon the drum 12 is a second drum 13, having flanges 14 projecting beyond the outer face thereof, and from the upper face of which there extends a flange 15, which is provided with a plurality of notches 16 in its upper edge. By reference to the drawings it will be seen that the drum 13 is shorter than the drum 12 and that the upper edge of the flange 15 is spaced somewhat from the under face of the platform 8. It will also be apparent that the drum 13 rests upon the collar 13' and is thus held above the platform 5.

The drum 12 has a longitudinal slot 17, as shown, from the edges of which project outwardly a pair of ears 18, between which is journaled one end of a latch 19, which may be moved to lie wholly within the drum 12 or to project outwardly therebeyond through the slot 17, it being understood that the lower end of the latch reaches below the upper edge of the flange 15, so that it may be engaged with the notches 16 to prevent independent movement of the drum 13 upon the drum 12.

Projecting inwardly from the latch 19 is a stem 20, having a perforation 21 at its free end, and with this perforation is loosely engaged a rod 22, having a head 23 upon its upper end to prevent its disengagement from the perforation, while permitting of its free movement therewithin.

To the under side of the platform 5 is secured a bracket 24, in which is journaled an angular lever 25, pivotally connected at one end with the lower end 26 of the rod 22. To the remaining end of the lever 25 is attached a cord 27, and it will be apparent that when this cord is pulled the lever will be operated to raise the rod 22 within the drum 12 and disengage the latch 19 from the notches 16.

The upper end of the drum 12 is provided with a removable cover 28, which carries a seat 29 and which has secured thereto a yoke 30, with which is engaged a beam 31, provided with means for attaching horses thereto. The cover 28 has a perforation 32 therein, with which is engaged a rod 33, which is attached to the latch 19, and by means of this rod also the latch may be drawn into the drum 12 to disengage it from the notches.

A cable 34 is attached to the drum 13, which may be attached to the hay-fork or other mechanism desired to be operated by the power mechanism.

In operation the latch 19 lies in engagement with one of the notches 16, and as the drum 12 is revolved the drum 13 will be revolved therewith and the cable 34 will be wound thereon. When it is desired to allow the cable to become slack to lower the hay-fork or for any other purpose, the cord 27 is pulled, which by operating the lever 25 and the rod 22 disengages the latch 19 from the notches 16 and permits the drum 13 to revolve independently of the drum 12. When it is desired to again tighten the cable 34, the cord 27 is released and the weight of the rod 22 will cause the latch 19 to engage itself with one of the notches 16, as this notch comes into registration with the slot 17. If the team is driven by a person occupying the seat 29, the latch may be retracted by the rod 33 instead of through the medium of the cord 27 and lever 25. As will be apparent, the free movement of the rod 22 in the perforation 21 will permit of the revolving of the drum 12.

What is claimed is—

1. A power mechanism comprising a rotatably-mounted drum, a second drum rotatably disposed upon the first-named drum, and means carried by the first drum to at times prevent rotation of the second drum thereon.

2. A power mechanism comprising a rotatably-mounted drum, a second drum rotatably disposed upon the first drum, and a latch carried by the first drum and adapted for engagement of the second drum at times to prevent rotation thereof upon the first-named drum.

3. A power mechanism comprising a rotatably-mounted drum, a second drum rotatably disposed upon the first-named drum and having notches therein, and a latch carried by the first-named drum and lying normally in engagement with one of the notches of the second-named drum, said latch being movable out of engagement with the notches.

4. A power mechanism comprising a rotatably-mounted drum, a second drum rotatably disposed upon the first drum and having a flange surrounding the first-named drum, said flange having notches therein, a latch carried by the first-named drum and lying normally in engagement with one of the notches of the flange to prevent rotation of the two drums independently, said latch being movable out of engagement with the notches, and being adapted for engagement with said notches interchangeably.

5. A power mechanism comprising a rotatably-mounted drum, a second drum rotatably mounted upon said drum, a flange carried by the second drum and having a plurality of notches therein, and a latch carried by the first-named drum and adapted for engagement with the notches of the flange interchangeably to prevent independent rotation of the two drums.

6. A power mechanism comprising a rotatably-mounted drum, a second drum rotatably disposed upon said drum, a flange carried by the second drum and having a plurality of notches therein, the first-named drum having a slot therein, a latch pivoted in the slot and adapted for engagement with the notches of the flange interchangeably to prevent independent rotation of the two drums, said latch having a shank projecting inwardly of the first-named drum, a rod pivotally connected with the free end of the shank, and a lever mounted adjacent to the first-named drum and pivotally connected with the rod, said rod and lever being adapted for operation to disengage the latch from the notches.

7. A power mechanism comprising a rotatably-mounted drum, a second drum rotatably disposed upon said drum, the second drum having a flange having a plurality of notches therein, a latch carried by the first-named drum and adapted for engagement with the notches of the flange interchangeably to prevent independent rotation of the two drums, means for disengaging the latch from the notches and a supplemental means for disengaging the latch from the notches.

In testimony whereof we affix our signatures in presence of two witnesses.

FRANK L. WILLIAMS.
JOSEPH J. DUCHESNE.

Witnesses:
PAT McMAHON,
F. W. KIEFER.